UNITED STATES PATENT OFFICE 2,376,523

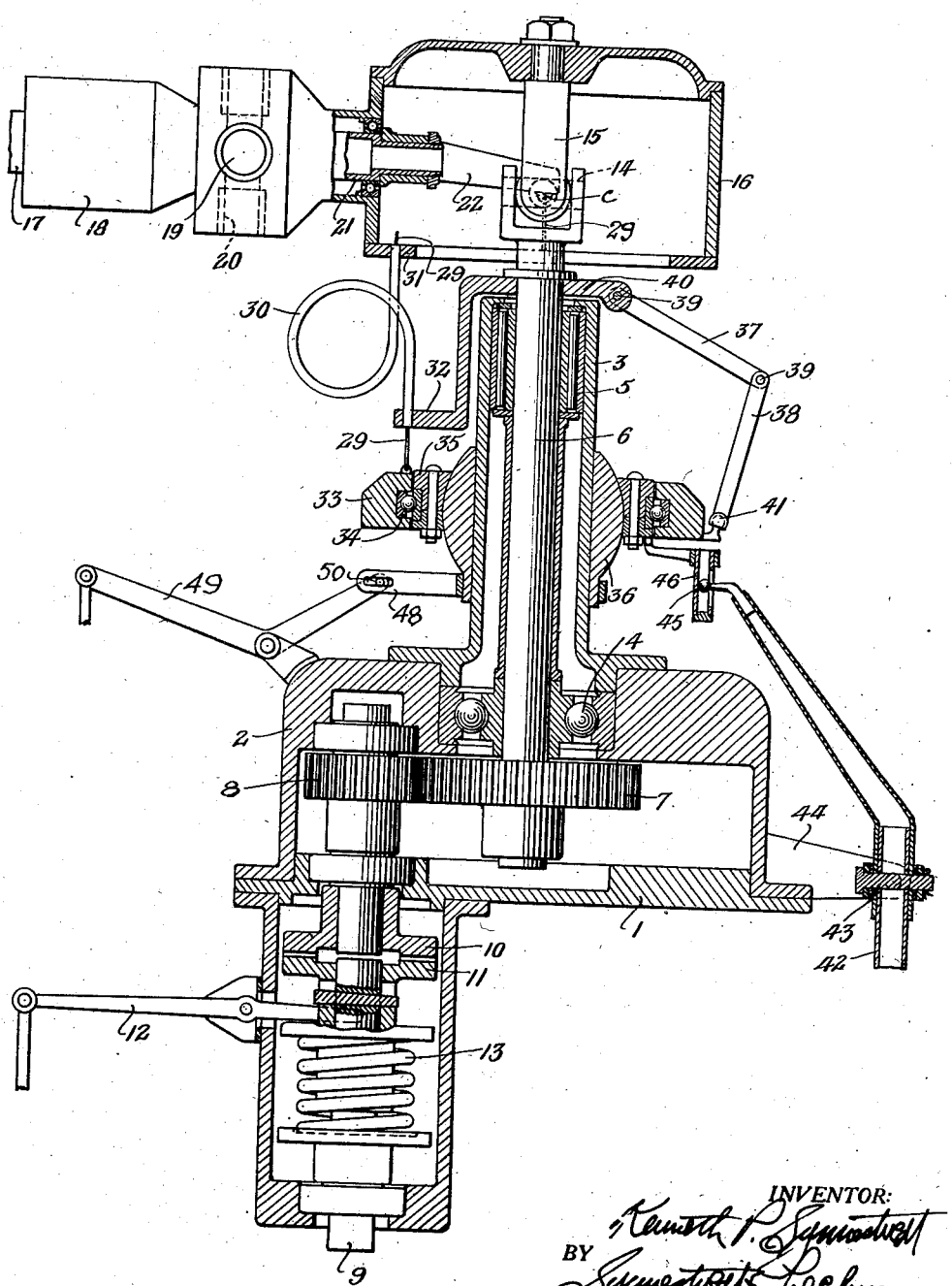

ROTATIVE WINGED AIRCRAFT

Kenneth P. Synnestvedt, Bryn Athyn, Pa., assignor to Autogiro Company of America, Philadelphia, Pa., a corporation of Delaware Application September 4, 1942, Serial No. 457,265

13 Claims. (Cl. 244—17)

This invention relates to rotative winged aircraft and is more particularly concerned with a novel arrangement of certain of the fundamental structural elements incorporated in the rotor hub. The invention is applicable either to an aircraft of the helicopter type, or to an aircraft of the autorotative winged type, or to machines capable of both types of operation.

Stated broadly, some of the most important objects of the invention are the provision of an improved type of rotor control, by which maneuvering may be effected, and also the provision of a novel blade and hub mounting providing improvement in smoothness of operation in several respects, as will further appear.

To bring out the nature of the improvements herein contemplated, reference is first made to certain known types of rotors and rotor control.

At this point it is mentioned that sustaining rotors for aircraft commonly incorporate some means for compensating for differential lift effects as between the advancing and retreating sides of the rotor during translational flight. Usually blade pivots are provided for this purpose, the pivots providing freedom for at least some blade swinging movement in a direction generally transverse the mean rotative path of travel of the blades.

As is now well understood in this art, control moments in a rotative winged aircraft may be secured by shifting the position of the lift line of the rotor with respect to the center of gravity of the machine. With most known types of control systems, the shift in the lift line of the rotor is an angular shift, this being achieved either by bodily tilting the rotor hub (as disclosed in copending application of Juan de la Cierva, Serial No. 645,985, filed December 6, 1932, corresponding to British Patent No. 393,976) or by imposing periodic differential change of blade pitch during rotation of the rotor (as disclosed in copending application of Juan de la Cierva, Serial No. 698,372, filed November 16, 1933, corresponding to British Patent No. 410,532).

In accordance with the disclosure of Cierva application 645,985, the stability and stiffness characteristics of a control system of the tilting type are dependent in part upon the vertical distance between the horizontal plane of the pivots connecting the blades with the hub and the horizontal plane of the fulcrums on which the hub may be tilted. As pointed out in said application, moreover, the extent of offset of the blade pivots from the axis of the hub determines the vertical position of the longitudinal and transverse "focal" points, i. e., the points at which the lift line of the resultant aerodynamic reaction of the rotor (projected on longitudinal and transverse planes) intersects the rotational axis of the hub at various different angles of incidence of the rotor as a whole with respect to the flight wind. In general, the greater the offset of the blade pivots the higher are the focal points and, assuming a given vertical position of the tilting trunnions for the hub, the stiffness of the control increases as the focal points are raised. It will be seen, therefore, that one important factor in determining the stability and stiffness characteristics of a tilting control system is the vertical distance between said focal points and the trunnions on which the hub may be tilted. Therefore, even with the tilting trunnions located in the same plane as the blade pivots, substantial offsetting of the blade pivots from the axis of rotation will raise the focal points well above the tilting trunnions.

Another characteristic of a rotor system as above described which should be kept in mind is that, in the event of an air disturbance at one side of the rotor, forces are set up tending to tilt the rotor in a direction to shed the effect of the disturbance. With the hub tilting fulcrums located below the focal points, the stability characteristics will automatically return the rotor to a neutral or mid position after correcting for a disturbance.

With the foregoing considerations in mind, the present invention contemplates a rotor system in which the hub is normally freely tiltable in all directions. For reasons brought out more fully hereinafter, in the preferred arrangement, the flapping pivots for the blades are appreciably offset from the axis of rotation and the hub is mounted for free tilting, as by a universal joint, about a point located on the hub axis. Preferably also, the center point about which hub tilting may take place is located close to the horizontal plane containing the flapping pivot axes, most desirably slightly below that plane, so that when the blades assume their normal coned position of flight, the longitudinal axes of the blade intersect the center point of hub tilting.

Beyond the foregoing, the invention has in view provision for imposing periodic differential changes of blade pitch, the means provided for this purpose constituting a rotor control system, which is coupled up with the pilot's flight control organ for effecting control in pitch and roll.

In contrast with prior systems incorporating means for imposing periodic differential blade pitch change, the system of the present invention provides for effecting such periodic changes of blade pitch with reference to the plane of rotation of the hub, regardless of the position to which the hub has floated under the influence of the particular flight condition and consequent flight forces acting thereon. Thus, in the preferred arrangement according to the present invention, the tilting movement of the hub does not alter the pitch position of the blades with reference to the hub.

In accordance with the foregoing, the control system of the present invention partakes somewhat of the character of a "servo" control, in the sense that the periodic differential changes of blade pitch are utilized for the purpose of causing the hub to float to and rotate in a different plane, this, in turn, bringing about a shift in the lift line of the rotor with reference to the center of gravity of the machine and thereby introducing the desired control moment.

The invention further contemplates combining with the foregoing features suitable means for altering the mean geometrical pitch of the blade means, and more specifically the provision of a control system operative to regulate the mean effective blade pitch independently of the hub rotational plane and of adjustment of differential blade pitch; the operating connections of said control system and of the control for the differential blade pitch being so constructed and arranged as to secure this independence of adjustment.

Other operational characteristics and advantages of the system proposed by the present invention, including advantages of smoothness and stability, will be discussed more fully hereinafter following a description of the accompanying drawing, which illustrates a preferred embodiment of the invention.

The single figure of the drawing is a vertical sectional view through a rotor hub and mounting parts therefor.

The hub is adapted to be carried by fixed structure 1, appropriately attached to structural elements in the body of the machine. A gear casing 2 surmounts the support 1 and a supporting tube 3 projects above the gear casing, these parts cooperating with bearings 4 and 5 in which the rotative hub spindle 6 is journaled. At its lower end spindle 6 carries a gear 7 meshing with the pinion 8 adapted to be driven from a shaft 9 through a clutch including cooperating complementary clutch dogs 10 and 11.

In the case of a helicopter, the drive transmission is normally connected, the rotor being driven for normal flight, although the clutch is manually disconnectible by means of a control 12 which may serve to move the clutch part 11 downwardly against the spring 13. Moreover, upon engine failure, even without actuation of the control 12, the clutch parts 10 and 11 (and spring 13) are arranged so as to act as an overrunning clutch, permitting the rotor to freely overrun the drive, with the blades at autorotational pitch. This may be relied upon in effecting descent without power in the helicopter type machine. On the other hand, in the case of an aircraft in which the rotor is normally autorotated in flight, the drive transmission would normally be disconnected, being coupled only for driving the rotor on the ground in preparation for take-off.

Simultaneous change-over of the pitch of all blades in the same sense (by mechanism described hereinafter) is preferably employed in the event of a changeover from a condition of power drive of the rotor to a condition of autorotation of the rotor, the mean blade pitch setting for the latter condition ordinarily being a smaller positive angle than is desirable for power driven operation.

Toward its upper end the rotative hub spindle 6 is provided with a universal joint 14 from which an extension 15 of the hub shaft projects upwardly to carry the hub proper 16. The universal joint 14 incorporates a plurality of pivots providing a central tilting point indicated at C, about which point the hub may freely tilt in any direction.

In considering the rotor blades and the attachment thereof to the hub, it is first pointed out that in accordance with this invention, at least three blades are incorporated in the rotor, three being the preferred number for reasons which will further appear. The root end of one such blade appears at 17 at the left of the drawing. This root end is received in a sleeve 18 and is journaled therein for movement on an axis preferably substantially coinciding with the longitudinal axis of the blade, so as to provide freedom for pitch change movement of the blade. Sleeve 18, in turn, is connected with the hub through flapping and drag pivots 19 and 20, respectively, it being particularly noted that the flapping pivot 19 is offset considerably from the axis of rotation of the hub.

A blade pitch control connection 21 extends inwardly from the blade itself into the hub, this connection being universally jointed at the intersection of pivots 19 and 20. The details of these pivot parts are not illustrated herein since they form no part of the present invention per se. However, a blade mounting of the type just described is fully disclosed in copending application of Cyril George Pullin, Serial No. 331,318, filed April 24, 1940, issued as Patent No. 2,337,570, December 28, 1943, and for further information on this structure reference may be made to said copending application. Within the hub, the pitch control connection 21 for each blade is provided with an actuating arm 22 extending generally circumferentially of the hub preferably to a point angularly offset from the blade by about 90°.

Only one blade with its arm 22 is shown, but it will be understood that the preferred arrangement includes three rotor blades, and three such arms 22 are thus located within the hub 16. Each arm adjacent its free end is coupled to a control cable 29 or other equivalent operating means of the push-pull type. The cable 29 for the arm 22 shown in the figure is illustrated fragmentarily, on the far side of the rotor shaft 6. The control cable 29 for one of the other rotor blade control arms is shown (broken off) at the left hand side of the figure at an angular relationship 90° from the other one. This is only diagrammatic, since for a three-bladed rotor these cables would come up into the hub at an angular spacing of 120°.

Each control cable 29 passes through a tube 30, the upper end of which is secured to an appropriate part, such as ring 31 mounted on and moving with the hub. The other end of each tube 30 is connected with a bracket 32 projecting from and rotating with the hub spindle 6.

The lower ends of cables 29 are attached to a rotatable swash ring 33 which is mounted by means of a bearing 34 on non-rotative swash member 35. The swash member 35 has a spherical seat cooperating with part 36.

In order to ensure rotation of ring 33 with the rotor, a scissors linkage 37—38 interconnects the ring and the hub spindle 6. To accommodate the tilting movements of ring 33 and yet at the same time to ensure rotation of the ring with the rotor hub, appropriate joints are incorporated in the scissors linkage. Thus, simple pivot joints 39 are desirably used between the two links 37 and 38, as well as between link 37 and the member 40 which rotates with the hub spindle. Joint 41 between link 38 and ring 33 is preferably a spherical or ball joint lying in a horizontal plane containing the center of tilting of ring 33, so as to accommodate the tilting movements.

Non-rotative swash member 35 (and thus also the rotative ring 33) may be tilted in any direction by means of a control lever 42. This lever is mounted by means of a universal joint at 43 on a fixed bracket 44, the upper end of the lever carrying a ball 45 mounted within a tube 46, the tube being slotted at one side to permit freedom for relative vertical movement of the ball. By tilting the control lever 42 in any direction, the ring 33 may similarly be caused to tilt in any direction.

The spherical part 36 on which the swash members are mounted is preferably movable vertically on the supporting sleeve 3, so as to provide for simultaneous change of the pitch of all blades in the same sense, i. e., a change in the mean effective pitch of the rotor. Vertical movement of spherical member 36 is effected by arm 48 with which the operating lever 49 is connected, through the slot and pin arrangement shown at 50. The connections of this control system, the connections 45 and 46 of the tilting control, and the use of the Bowden controls 29—30 between the swash blade and the individual blade pitch control arms 22, cooperate in securing independence of operation of the simultaneous and differential pitch controls relative to each other and to the variations in plan of rotation of the hub. The change of mean effective rotor blade pitch may be used as a flight control (i. e., by causing a change of rotor thrust), as a jump take-off control, as a means for converting the rotor from helicopter operation to autorotational operation (for example, upon engine failure), and for other purposes.

With the foregoing structural features in mind, attention is directed to certain operating characteristics, as follows:

In the first place, with a rotor having at least three blades pivotally connected with the hub on flapping pivots offset from the rotational axis, the universal joint 14 permits the hub to float freely about the center point C to that position in which the axis of rotation of the hub itself constitutes a bisector of the angle between the blades at opposite sides of the rotor. For instance, considering the plane of the drawing, the axis of rotation of the hub will always coincide with the bisector of the angle formed between the longitudinal axis of the blades as they pass at the left-hand side of the drawing and the longitudinal axis of the blades as they pass at the right-hand side of the drawing. Stated in another way, with the arrangement described, the axis of rotation of the hub will always coincide with the axis of the cone formed when the blades assume their normal average coned position of flight. The use of three blades is important for the above purpose, although it may be noted that other rotor arrangements, for instance, incorporating more or less than three blades, may be constructed to have inherent stability characteristics such as to make possible the use thereof with the freely floating hub and other features of this invention.

The point just mentioned is of advantage for the following reasons:

As is known, during translational flight of an aircraft having blades pivoted to a hub which is not freely tiltable, the blades have a higher average coning position on the retreating side of the rotor than on the advancing side of the rotor. In translational flight, the highest point is ordinarily reached when any particular blade has passed a little beyond the forwardmost position (for instance, about 30° beyond). Because of this, with a hub having a fixed rotational axis, the blades are asymmetrically disposed with respect to that axis, the position of each blade periodically changing from the high point to the low point, the latter being approximately diametrically opposite to the high point. As an effect of this variation in position of the blades with reference to the physical axis of rotation of the hub (in a system incorporating a hub having a fixed axis), periodic angular excursions of the rotor lift line are set up, the excursions being in the direction of the position of highest coning in the circle of rotation.

Such periodic excursions are objectionable and, in addition, the factors mentioned above also have a tendency to introduce an out-of-pattern blade position when the rotor is viewed in plan along the rotor axis.

By the employment of a free floating hub, and of flapping pivots for the blades appreciably offset from the hub axis, the plane of rotation of the hub follows the mean plane of rotation of the blades, in consequence of which at least the major periodic excursions of the lift line away from the rotational axis of the hub are eliminated. The arrangement, therefore, maintains the rotational axis of the hub always in a position of substantial coincidence with the lift line of the rotor.

If irregular disturbances occur, such, for example, as an air bump concentrated toward one side of the rotor, the resulting movement of the blades as they pass the zone of the disturbance will cause the rotor hub to similarly shift, the effect of these movements being in the sense desired to correct for the disturbance. When the disturbance has ceased, the rotor will return again to the normal position, because of the location of the rotor focal points well above the center C of tilting.

In truly vertical descent, the normal position of floating of the hub will be such that the axis on which the hub rotates will pass not only through the tilting center C but also through the center of gravity of the aircraft. This, of course, ignores secondary influences which may somewhat alter the condition just mentioned, such as the effect of airflow over other surfaces of the machine, and especially tail surfaces thereof.

On the other hand, during high speed translational flight, the differential lift effect at opposite sides of the rotor will tend to cause the hub to float to a position in which its axis is angularly shifted considerably ahead of the center of gravity of the aircraft. According to the present invention, however, this may be controlled by imposing periodic differential changes of blade pitch in a sense opposite to and compensating for the differential lift effects set up as a result of higher air speed on the advancing side of the rotor than on the retreating side. Thus, as translational flight speed is increased, it is contemplated that the mid position of the pilot's control stick will correspondingly be advanced. Control for maneuvering will, therefore, involve control stick displacement from the mid position required to maintain normal flight attitude under any particular condition of flight operation.

It is important to note in connection with the foregoing control system, that the periodic differential changes of blade pitch always take place with reference to the plane of rotation of the hub, rather than with reference to a plane fixed with respect to the body of the machine. In this way, the control acts in a sense as a servo means for controlling the plane in which the rotor will operate, the hub still remaining free under all conditions to rotate in a plane such that the axis of the hub coincides with the axis of the cone of the rotor and, therefore, of the lift line of the rotor.

Still another feature which is of importance in the full floating hub arrangement above described, is the employment of blade pivots arranged with the pitch change pivot located outboard of the flapping pivot, i. e., outboard in the sense that pitch change movement of the blade does not angularly shift the position of the flapping pivot axis. This further contributes to the maintenance of a symmetrical blade pattern with respect to the floating hub member, as will be apparent if it be kept in mind that the pitch control mechanism for maneuvering imposes periodic differential changes of blade pitch. If the pitch mounting were located inboard of the flapping pivot, such differential pitch changes would set up a condition in which the flapping pivots occupied different angular positions at different points in the circle of rotation.

Because of the characteristic just mentioned, and in view of other characteristics considered hereinbefore, it is contemplated in accordance with the present invention that the drag pivot which has heretofore customarily been used may even be eliminated. In any event, even if the drag pivot be employed, the characteristics discussed above will eliminate at least most of the forces heretofore encountered in flight tending to move the blades on the drag pivots.

I claim:

1. For an aircraft, a sustaining rotor comprising a hub and at least three blades, each blade being pivotally connected with the hub on an axis offset from the rotational axis and providing freedom for swinging movement of the blade in a direction generally transverse the mean rotative path of travel of the blades, means mounting the hub for tilting movement in all directions about a point on the rotational axis to provide for free floating to and rotation in different planes, and mechanism for controlling the plane of rotation of the rotor and thereby the position of the lift line comprising controllable means for differentially varying the pitch angle of the blades with respect to the floating hub in synchronism with the period of rotation, said controllable means providing for maintenance of a substantially given differential pitch variation (with reference to the hub), with a given control adjustment, regardless of the plane of rotation of the hub.

2. A construction in accordance with claim 1 in which the mounting means for the hub provides a center point for hub tilting which point is slightly offset below the plane of the blade pivots, the degree of offset being such that when the blades are in the average coned position of flight, the longitudinal axes of the several blades approximately intersect the said point.

3. For an aircraft, a sustaining rotor comprising a hub and at least three blades, each blade being pivotally connected with the hub on an axis offset from the rotational axis and providing freedom for swinging movement of the blade in a direction generally transverse the mean rotative path of travel of the blades, means mounting the hub for tilting movement in all directions about a point on the rotational axis to provide for free floating to and rotation in different planes, and mechanism for controlling the plane of rotation of the rotor and thereby the position of the lift line comprising a swash member mounted for controllable tilting independently of the position of said tiltable hub, and operating connections from said member to the blades adapted to effect periodic differential blade pitch change in predetermined relation to the adjustment of the swash member regardless of position of the tiltable hub.

4. A construction in accordance with claim 3 in which the mounting means for the hub provides a center point for hub tilting located close to the horizontal plane of the blade pivots.

5. For an aircraft, a sustaining rotor comprising a hub and at least three blades, each blade being connected with the hub by a flapping pivot having its axis offset from the rotational axis of the hub and also by a pitch change mounting which is operatively interposed between the blade and the flapping pivot, means mounting the hub for tilting movement in all directions to provide for free floating to and rotation in different planes, and mechanism for controlling the plane of rotation of the rotor and thereby the position of the lift line comprising controllable means for differentially varying the effective pitch angle of the blades with respect to the floating hub in synchronism with its period of rotation, said controllable means providing for maintenance of a substantially given differential pitch variation (with reference to the hub), with a given control adjustment, regardless of the plane of rotation of the hub.

6. A construction in accordance with claim 5 in which the mounting means for the hub provides a center point for hub tilting located on the rotational axis of the hub.

7. For an aircraft, a sustaining rotor comprising a hub and at least three blades, each blade being connected with the hub by a flapping pivot having its axis offset from the rotational axis of the hub and also by a pitch change mounting which is operatively interposed between the blade and the flapping pivot, means mounting the hub for tilting movement in all directions to provide for free floating to and rotation in different planes, and mechanism for controlling the plane of rotation of the rotor and thereby the position of the lift line comprising a swash member mounted for controllable tilting independently of the position of said tiltalbe hub, and operating connections from said member to the blades adapted to effect periodic differential blade pitch change in predetermined relation to the adjustment of the swash member regardless of position of the tiltable hub.

8. For an aircraft, a sustaining rotor comprising a hub and at least three blades, each blade being pivotally connected with the hub on an axis offset from the rotational axis and providing freedom for swinging movement in a direction generally transverse the mean rotative path of travel of the blades, means mounting the hub for tilting movement at least in an approximately fore-and-aft direction about a generally transverse axis substantially intersecting the rotor axis to provide for free floating to and rotation in different planes, and mechanism for controlling the plane of rotation of the rotor and thereby the position of the lift line comprising a swash member mounted for controllable tilting independently of the position of said tiltable hub, and operating connections from said member to the blades adapted to effect periodic differential blade pitch change in predetermined relation to the adjustment of the swash member regardless of position of the tiltable hub.

9. For an aircraft, a sustaining rotor comprising a hub and blade means, the latter being pivotally connected with the hub by means providing freedom for swinging movement in a direction generally transverse the mean rotative path of travel, means mounting the hub for tilting movement at least in an approximately fore-and-aft direction about a generally transverse axis substantially intersecting the rotor axis to provide for free floating to and rotation in different planes, and mechanism for controlling the plane of rotation of the rotor and thereby the position of the lift line comprising a swash member mounted for controllable tilting independently of the position of said tiltable hub, and operating connections from said member to the blades adapted to effect periodic differential blade pitch change in predetermined relation to the adjustment of the swash member regardless of position of the tiltable hub.

10. For an aircraft, a sustaining rotor comprising a hub and blade means, the latter being connected with the hub by means providing freedom for swinging movement in a direction generally transverse the mean rotative path of travel, and also by means operatively interposed between said first means and the blade and providing for pitch change movement, means mounting the hub for tilting movement in all directions to provide for free floating to and rotation in different planes, and mechanism for controlling the plane of rotation of the rotor and thereby the position of the lift line comprising controllable means for differentially varying the effective blade pitch angle with respect to the floating hub in synchronism with its period of rotation, including operating connections to the blade means adapted to effect a substantially given differential pitch variation (with reference to the hub), with a given control adjustment regardless of the plane of rotation of the hub.

11. For an aircraft, a sustaining rotor comprising a hub and blade means, the latter being pivotally connected with the hub by means providing freedom for swinging movement in a direction generally transverse the mean rotative path of travel, means mounting the hub for tilting movement at least in an approximately fore-and-aft direction about a generally transverse axis substantially intersecting the rotor axis to provide for free floating to and rotation in different planes, mechanism for controlling the plane of rotation of the rotor and thereby the position of the lift line comprising controllable means for differentially varying the effective blade pitch angle with respect to the floating hub in synchronism with its period of rotation, including operating connections to the blade means adapted to effect a substantially given differential pitch variation (with reference to the hub), with a given control adjustment regardless of the plane of rotation of the hub, and means for altering the mean geometrical pitch of the blade means.

12. For an aircraft, a sustaining rotor comprising a hub and blade means, the latter being pivotally connected with the hub by means providing freedom for swinging movement in a direction generally transverse the mean rotative path of travel, means mounting the hub for tilting movement at least in an approximately fore-and-aft direction about a generally transverse axis substantially intersecting the rotor axis to provide for free floating to and rotation in different planes, mechanism for controlling the plane of rotation of the rotor and thereby the position of the lift line comprising controllable means for differentially varying the effective blade pitch angle with respect to the floating hub in synchronism with its period of rotation, including operating connections to the blade means adapted to effect a substantially given differential pitch variation (with reference to the hub), with a given control adjustment regardless of the plane of rotation of the hub, and a control system operative to regulate the mean effective blade pitch independently of hub rotational plane and of adjustment of differential blade pitch.

13. In an aircraft, a rotor comprising a hub member mounted to rotate about a generally upright axis, means mounting the hub member for tilting movement at least in one plane to provide for free floating to and rotation in different planes, radially extending blades each having a root end mounting member, for each blade mechanism for pivotally interconnecting the hub member and said mounting member to provide for pivotal movement of the blade as a whole with respect to the hub, said pivot mechanism for each blade including a flapping pivot and a pitch change pivot, and controllable means for cyclically shifting the blades each as a unit on its pitch change pivot in synchronism with rotation of the rotor, the pitch change pivot for each blade being operatively interposed between the flapping pivot and the blade mounting member, whereby operation of the cyclical pitch control means does not shift the position of the flapping pivot axis.

KENNETH P. SYNNESTVEDT.